(12) United States Patent
Takahashi et al.

(10) Patent No.: US 9,406,126 B2
(45) Date of Patent: Aug. 2, 2016

(54) IMAGE PROCESSING APPARATUS AND METHOD, AND ULTRASONIC DIAGNOSTIC APPARATUS

(71) Applicant: Sony Corporation, Minato-ku (JP)

(72) Inventors: Yoshitomo Takahashi, Kanagawa (JP); Tatsumi Sakaguchi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/527,116

(22) Filed: Oct. 29, 2014

(65) Prior Publication Data

US 2015/0146953 A1 May 28, 2015

(30) Foreign Application Priority Data

Nov. 27, 2013 (JP) .................... 2013-244951

(51) Int. Cl.
*G06K 9/00* (2006.01)
*G06T 7/00* (2006.01)
*G06T 11/60* (2006.01)
*G06T 3/00* (2006.01)

(52) U.S. Cl.
CPC ............. *G06T 7/0012* (2013.01); *G06T 3/0006* (2013.01); *G06T 11/60* (2013.01)

(58) Field of Classification Search
None
See application file for complete search history.

(56) References Cited

U.S. PATENT DOCUMENTS

| 2008/0188743 | A1* | 8/2008 | Waki ................... A61B 8/08 600/438 |
| 2009/0005679 | A1* | 1/2009 | Dala-Krishna ...... A61B 8/0883 600/437 |
| 2013/0336551 | A1* | 12/2013 | Clingman ............ A61B 5/0095 382/128 |

FOREIGN PATENT DOCUMENTS

JP 2010-172699 A 8/2010

* cited by examiner

*Primary Examiner* — Shervin Nakhjavan
(74) *Attorney, Agent, or Firm* — Oblon, McClelland, Maier & Neustadt, L.L.P.

(57) ABSTRACT

An image processing apparatus includes: when a probe is moved, a shift amount correction section configured to correct an amount of shift from a first frame to a second frame being a frame at different time from the first frame; and a distortion amount calculation section configured to calculate an amount of distortion on the basis of a phase difference detected from the first frame and the second frame having been subjected to shift amount correction by the shift amount correction section.

12 Claims, 10 Drawing Sheets

IMAGE PROCESSING APPARATUS AND METHOD, AND ULTRASONIC DIAGNOSTIC APPARATUS

CROSS REFERENCE TO RELATED APPLICATIONS

This application claims the benefit of Japanese Priority Patent Application JP 2013-244951 filed Nov. 27, 2013, the entire contents of which are incorporated herein by reference.

BACKGROUND

The present disclosure relates to an image processing apparatus and method, and an ultrasonic diagnostic apparatus. In particular, the present disclosure relates to an image processing apparatus and method that are capable of correctly detecting a displacement when a probe is moved, and an ultrasonic diagnostic apparatus.

In elastography that evaluates the stiffness of tissue using ultrasonic waves, the displacement of the tissue is detected by giving vibration in the depth direction in a stationary state of a probe.

However, it is not possible to correctly detect the displacement of the tissue in a moving state of the probe. This is because although a corresponding point to be used for detecting the displacement is moved, no correction is performed for that movement.

In this regard, in acoustic radiation force impulse (ARFI), some apparatuses detect the amount of shift between a desired irradiation position and an actual irradiation position (refer to Japanese Unexamined Patent Application Publication No. 2010-172699).

SUMMARY

That is to say, in a moving state of a probe, a corresponding point to be used for detecting a displacement is shifted by the movement, and thus corresponding lines between frames are not in alignment. Accordingly, it is not possible to correctly detect a displacement of tissue in the moving state of the probe.

The present disclosure has been made in view of such circumstances. It is desirable to enable detection of a displacement correctly when a probe is moved.

According to an embodiment of the present disclosure, there is provided an image processing apparatus including: when a probe is moved, a shift amount correction section configured to correct an amount of shift from a first frame to a second frame being a frame at different time from the first frame; and a distortion amount calculation section configured to calculate an amount of distortion on the basis of a phase difference detected from the first frame and the second frame having been subjected to shift amount correction by the shift amount correction section.

In the above-described embodiment, the image processing apparatus may further include a superimposition section configured to superimpose the amount of distortion calculated by the distortion amount calculation section on a B-mode image.

In the above-described embodiment, the first frame and the second frame may be images having a direction other than a direction parallel to a direction in which the B-mode image is generated.

In the above-described embodiment, the first frame and the second frame may be images having a direction parallel to a direction in which the B-mode image is generated.

In the above-described embodiment, the first frame and the second frame may be images having a direction parallel to a direction in which the probe is moved.

In the above-described embodiment, the superimposition section may superimpose the amount of distortion calculated by the distortion amount calculation section on the B-mode image in a direction perpendicular to a direction of calculating the amount of distortion.

In the above-described embodiment, the superimposition section may superimpose the amount of distortion calculated by the distortion amount calculation section on the B-mode image in a direction parallel to a direction of calculating the amount of distortion.

In the above-described embodiment, the image processing apparatus may further include a superimposition section configured to superimpose the amount of distortion calculated by the distortion amount calculation section on an endoscope image of a subject.

According to another embodiment of the present disclosure, there is provided a method of processing an image for causing an image processing apparatus to perform processing including: when a probe is moved, correcting an amount of shift from a first frame to a second frame being a frame at different time from the first frame; and calculating an amount of distortion on the basis of a phase difference detected from the first frame and the second frame having been subjected to correction of the amount of shift by the shift amount correction section.

According to another embodiment of the present disclosure, there is provided an ultrasonic diagnostic apparatus including: a probe; and an image processing section, wherein the image processing section includes when a probe is moved, a shift amount correction section configured to correct an amount of shift from a first frame to a second frame being a frame at different time from the first frame; and a distortion amount calculation section configured to calculate an amount of distortion on the basis of a phase difference detected from the first frame and the second frame having been subjected to correction of the amount of shift by the shift amount correction section.

In the above-described embodiment, the image processing section may further include a superimposition section configured to superimpose the amount of distortion calculated by the distortion amount calculation section on a B-mode image.

In the above-described embodiment, the probe may include a plurality of piezoelectric elements in a first direction, and in a second direction being perpendicular to the first direction, respectively, and the first frame, and the second frame are images having a direction other than a direction parallel to a direction of generating the B-mode image.

In an embodiment of the present disclosure, when a probe is moved, an amount of shift from a first frame to a second frame being a frame at different time from the first frame is corrected. Then, an amount of distortion is calculated on the basis of a phase difference detected from the first frame and the second frame having been subjected to shift amount correction.

With the present disclosure, it is possible to detect a displacement. In particular, when a probe is moved, it is possible to correctly detect a displacement.

DETAILED DESCRIPTION OF EMBODIMENTS

In the following, a description will be given of a mode for carrying out the present disclosure (hereinafter referred to as an embodiment). In this regard, the description will be given in the following order.

1. First embodiment (ultrasonic image processing apparatus)
2. Second embodiment (computer)

First Embodiment

Example of Axes and Movement of Probe

Figure 1:
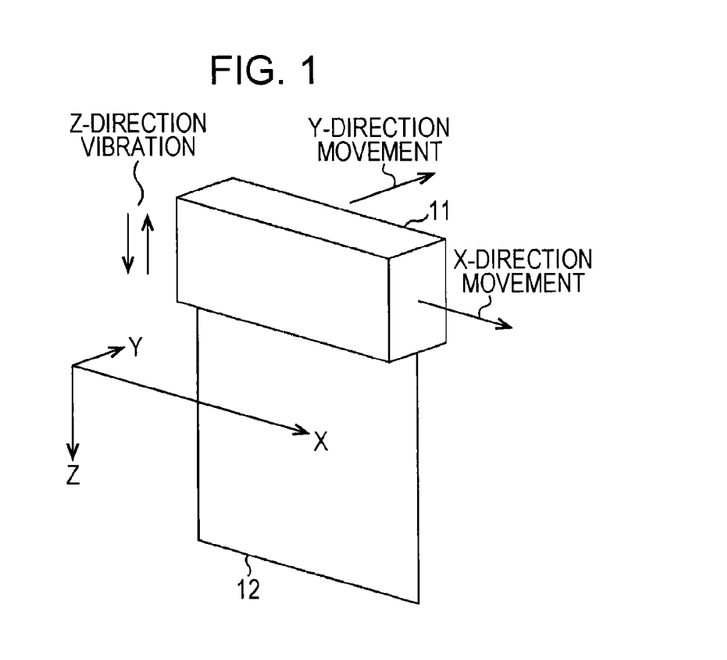
FIG. 1 is an explanatory diagram of axes and movement of a probe.

First, a description will be given of the axes and the movement of a probe with reference to FIG. 1. In this regard, in order to simplify the description, it is assumed that a 1D probe is cuboid-shaped.

As axes of a probe 11, an X-axis, a Y-axis, and a Z-axis are assigned to a major axis direction, a minor axis direction, and a depth direction, respectively. In the following, a description will be given using XYZ. The probe 11 includes a plurality of piezoelectric elements in an array. The major axis direction is a direction in which a larger number of piezoelectric elements in the array are arranged than that of the minor axis direction, and is a direction in which the overall length of the piezoelectric elements is long. The minor axis direction is a direction in which a smaller number of piezoelectric elements in the array are arranged than that of the major axis direction, and is a direction in which the overall length of the piezoelectric elements is shorter than the major axis direction. The depth direction is a same direction as an ultrasonic output direction.

For example, in the case of a 1D probe, RF signals received by the piezoelectric elements disposed in the X-direction array are arranged so that an ultrasonic image 12 is generated.

In this regard, as movement of the probe 11, in the Z-direction, vibration from the probe 11 is provided in order to obtain elastography. Also, it is assumed that in the X-direction and in the Y-direction, regular or irregular motions are provided by the operation of a user, and the like. As an example, it is thought that uniform movement by the sweep operation is provided in the Y-direction, and irregular movement caused by such as camera shake, or the like is provided in the X-direction.

Example of Configuration of Probe

Figure 2:
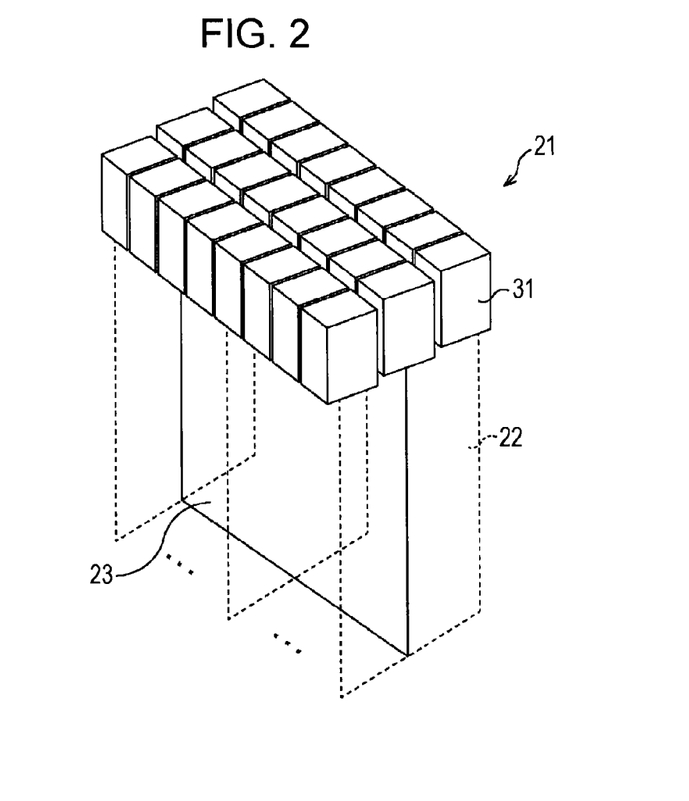
FIG. 2 is a diagram illustrating an example of a configuration of a probe used in the present technique.

FIG. 2 is a diagram illustrating an example of a configuration of a probe used in the present technique. In this regard, in the present technique, it is necessary that two piezoelectric elements or more (for example, vibrators) 31 are disposed in the Y-direction in order to detect movement in the Y-direction illustrated in FIG. 1. That is to say, the probe 21 is configured as a 1.5-D or 2D-array probe. In this regard, as described later, it is also possible to use a 1-D probe depending on directions of an image to be used and an image to be superimposed.

The example in FIG. 2 illustrates a 1.5-D probe 21 including an array of piezoelectric elements 31, in which eight elements are disposed in the X-direction, and three elements are disposed in the Y-direction.

As described above with reference to FIG. 1, RF signals received by the individual piezoelectric elements 31, respectively, are arranged so that an ultrasonic image is generated. In the example in FIG. 2, when attention is focussed on the X-direction, eight piezoelectric elements 31 are arranged in three lines, and thus three ultrasonic images (hereinafter, referred to as X-direction ultrasonic images) 23 are generated. In the same manner, when attention is focussed on the Y-direction, three piezoelectric elements 31 are arranged in eight lines, and thus eight ultrasonic images (hereinafter, referred to as Y-direction ultrasonic images) 22 are generated. The X-direction ultrasonic images 23 are used for generating the B-mode image.

In this manner, in the probe according to the present technique, ultrasonic images are also generated in the Y-direction, and thus it is possible to perform block matching using them. Accordingly, it is possible to trace corresponding points to be used for detecting a displacement.

In this regard, although not illustrated in the example in FIG. 2, in the case of 2D-array probe, the same number of piezoelectric elements are disposed in the X-direction and the Y-direction.

Overview of the Present Technique

Figure 3A:
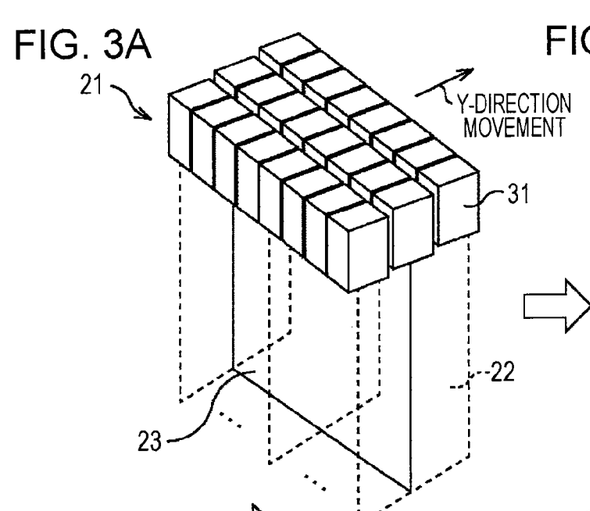
FIGS. 3A to 3D are explanatory diagrams of an overview of the present technique.
Figure 3B:
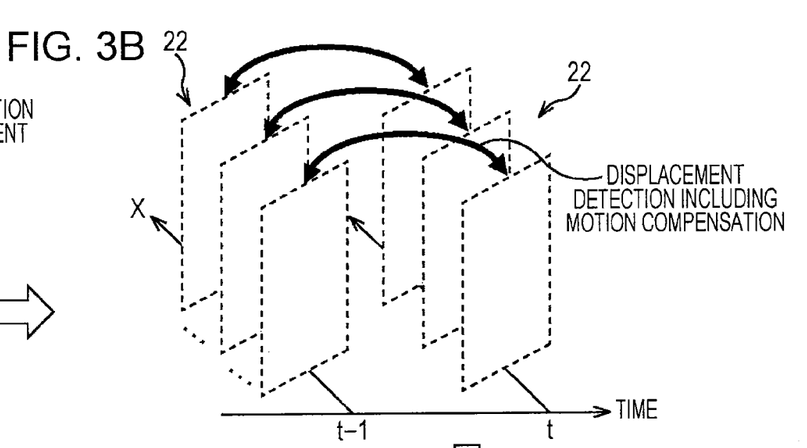

FIGS. 3A to 3D are diagrams that specifically explain the present technique. As illustrated in FIG. 3A, the case where there is a motion in the Y-direction is illustrated. In order to detect a motion in the Y-direction, as illustrated in FIG. 3B, two pieces of (two pieces at time t and at time t−1, respectively) Y-direction ultrasonic images 22 having different time for eight elements in the X-direction are used. In order to detect this motion, it is possible to apply a method using block matching, or the like, for example. Thereby, it is possible to obtain motion vectors.

In the example in FIGS. 3A to 3D, three elements are disposed in the Y-direction, and thus it is possible to detect a motion as small as a pitch between elements×2 [um]. As a larger number of piezoelectric elements 31 are disposed in the Y-direction, it becomes possible to detect a larger motion.

Next, corresponding lines between frames are shifted by the motion in the Y-direction. Accordingly, as illustrated in FIG. 3B, displacement detection with motion compensation is performed using the detected motion vectors. That is to say, motion compensation is performed on the image of time (t−1) using the detected motion vectors, and thus the motion compensated image is generated. In this regard, in the case where the motion vector is shorter than the pitch between elements at this time, interpolation processing is performed to generate a pixel having decimal places. It is, therefore possible to compensate a smaller motion than a pitch between elements.

Then, phase-difference detection processing is performed between the image at time t, and the motion compensated image at time (t−1). For example, it is possible to use an autocorrelation method as phase-difference detection processing. Then, the displacement, and the amount of distortion are detected by the phase-difference detection result.

In this regard, the above-described processing is performed for the three elements in the Y-direction. Accordingly, by aggregating the results for the three elements, the distortion amount data for one scan line is generated for the X-direction ultrasonic image 23. It does not matter if any other method is used for the method of aggregation. For example, an average, a median, and the like may be used, but any other method may be used as far as a method of aggregation. Also, the result of one element among the three elements (for example, one element in the middle) may be selected and used without using aggregation.

Further, it is possible to perform motion detection and compensation using a large number of elements, and to perform phase-difference detection processing using some elements or one element among the large number of elements.

Figure 3C:
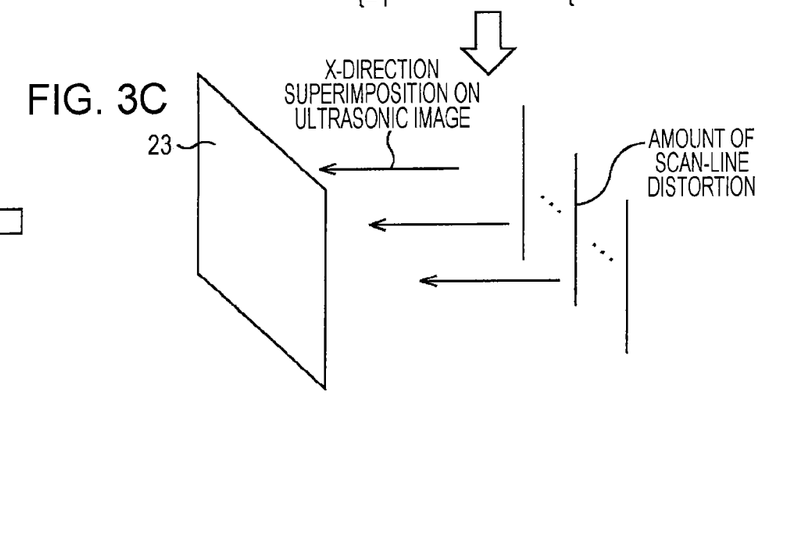
Figure 3D:
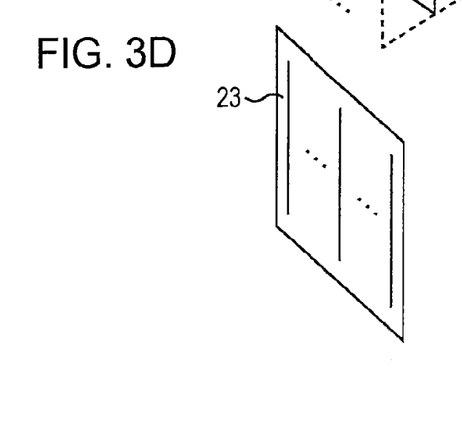

By repeating the above-described processing using three elements corresponding to each scan line of the X-direction ultrasonic image 23, it is possible to generate distortion amount data for all the scan lines. The distortion amount data is displayed by being superimposed on the X-direction ultrasonic image 23 as illustrated in FIG. 3C.

As described above, the motion detection and compensation is performed using the ultrasonic images parallel to the motion direction. The result is displayed by being superimposed on an ultrasonic image (B-mode image) which is perpendicular to the motion direction. To put it in another way, the motion detection and compensation is performed using an ultrasonic image that is perpendicular to a direction in which the B-mode image is generated. Then, the result is superimposed on the B-mode image to be displayed.

In this regard, in the case of 2D-probe, for example, eight elements are disposed in the X-direction, and eight elements are disposed in the Y-direction. Accordingly, when there is a motion in the Y-direction, it is also possible to detect and compensate the motion by the Y-direction (the parallel direction) images, and to superimpose the result on the Y-direction (the parallel direction) image. In this case, it is possible to perform detection and compensation on eight Y-direction plane images without aggregating eight-element data, respectively.

Also, in the above-described description, a description has been given of the example of detecting a motion in the Y-direction. However, it is possible to detect a motion in the X-direction. For example, in the case of 1D-probe, if there is a motion in the X-direction, the motion detection and compensation is performed in the X-direction (parallel direction), and to superimpose the result on the X-direction (parallel direction) image.

Further, in the case of 2D-probe, if there is a motion in the X-direction, it is possible to perform the motion detection and compensation in the X-direction (parallel direction), and to superimpose the result in the Y-direction (perpendicular direction).

That is to say, in the present technique, when a probe is moved, the amount of shift between two frames at different time is corrected, the phase difference between the first frame and the second frame having been subjected to the correction of the amount of shift is detected. Then, the amount of distortion is calculated on the basis of the detected phase difference.

Thereby, it is possible to correctly detect the displacement in a state of moving the probe. Accordingly, it is possible to correctly obtain stiffness of tissue.

In this regard, it is possible to apply the present technique not only to the case of moving along the X-axis, Y-axis, and Z-axis, but also to the case of moving at an angle. In the case of moving at an angle, it is possible to decompose a motion component into the X-direction and the Y-direction, to perform motion detection and displacement detection in the individual directions, and to obtain the amount of distortion from the result of statistical processing (for example, averaging).

Further, it is possible to apply the present technique to the case where the probe 21 moves with eccentricity (moves with a rotation angle).

Eccentricity of Probe

Figure 4:
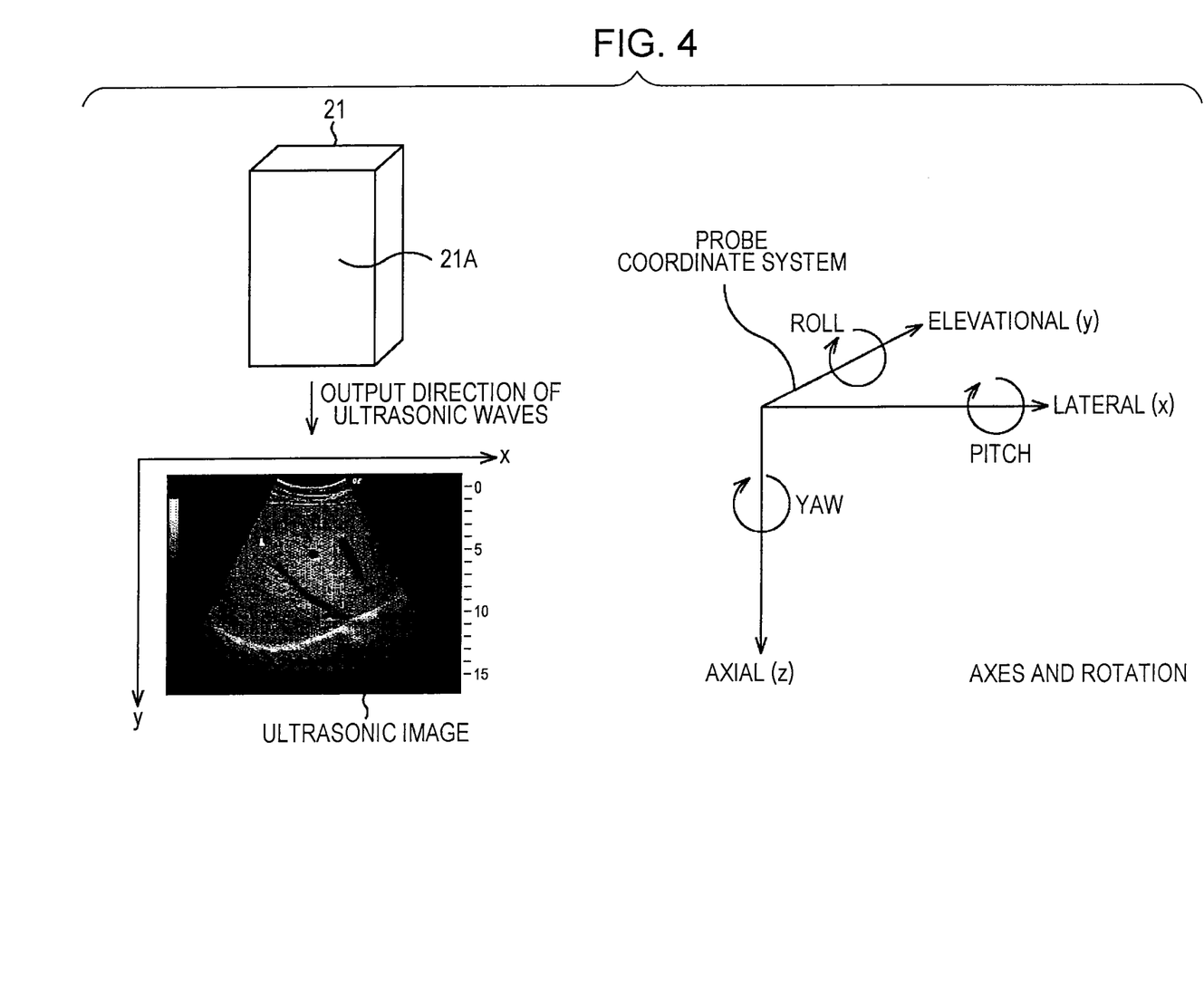
FIG. 4 is an explanatory diagram of eccentricity of a probe.

FIG. 4 is an explanatory diagram of eccentricity of a probe.

There are three kinds of eccentricity of the probe 21 with respect to the direction in which ultrasonic waves are output from the probe 21 (the ultrasonic-wave output direction), namely a rotation angle in the yaw direction, a rotation angle in the pitch direction, and a rotation angle in the roll direction.

When the probe 21 is put on an examinee immediately before, for example, let the position of the probe 21 be an origin, and a three-dimensional coordinate system with the position of the probe 21 as the origin, and the z-axis as the direction of gravity be called as a probe coordinate system. At this time, a rotation angle in the pitch direction represents a rotation angle around the x-axis of the probe coordinate system, a rotation angle in the roll direction represents a rotation angle around the y-axis of the probe coordinate system, and a rotation angle in the yaw direction represents a rotation angle around the z-axis of the probe coordinate system.

Here, in order to simplify the explanation, it is assumed that the probe 21 is cuboid-shaped. Let's focus on a front face 21A, which is a parallel face to the ultrasonic-wave output direction among faces of the cuboid as the probe 21 in a state in which the ultrasonic-wave output direction matches the z-axis of the probe coordinate system. For example, as illustrated in FIG. 4, although the visual state of the probe 21 is the same, the rotation angles in the yaw direction are different between the case where the front face 21A faces the near side and the case where the front face 21A faces the opposite side after the rotation of 180 degrees around the z-axis.

Also, in the example in FIG. 4, the x-axis and the y-axis of the coordinate system of the ultrasonic image are illustrated. Note that the x-axis and the y-axis of the coordinate system of the ultrasonic image represent the lateral direction and the longitudinal direction of the ultrasonic image, respectively, and are different from the x-axis and the y-axis of the probe coordinate system.

In this regard, it is possible to perform motion detection of a rotation in the pitch direction using two images in the x-direction, and to perform motion detection of a rotation in the roll direction using two images in the y-direction. It is possible to handle a rotation in the yaw direction in the same manner as movement at an angle by decomposing the rotation in the x-direction and the y-direction.

In this manner, it is possible to apply the present technique to the case where the probe 21 moves with eccentricity (moves with a rotation angle). For example, by obtaining an affine parameter, and the like between frames, it is possible to handle this matter in the same manner as the case of moving at an angle, or the like.

Example of Configuration of Ultrasonic Image Processing Apparatus

Figure 5:
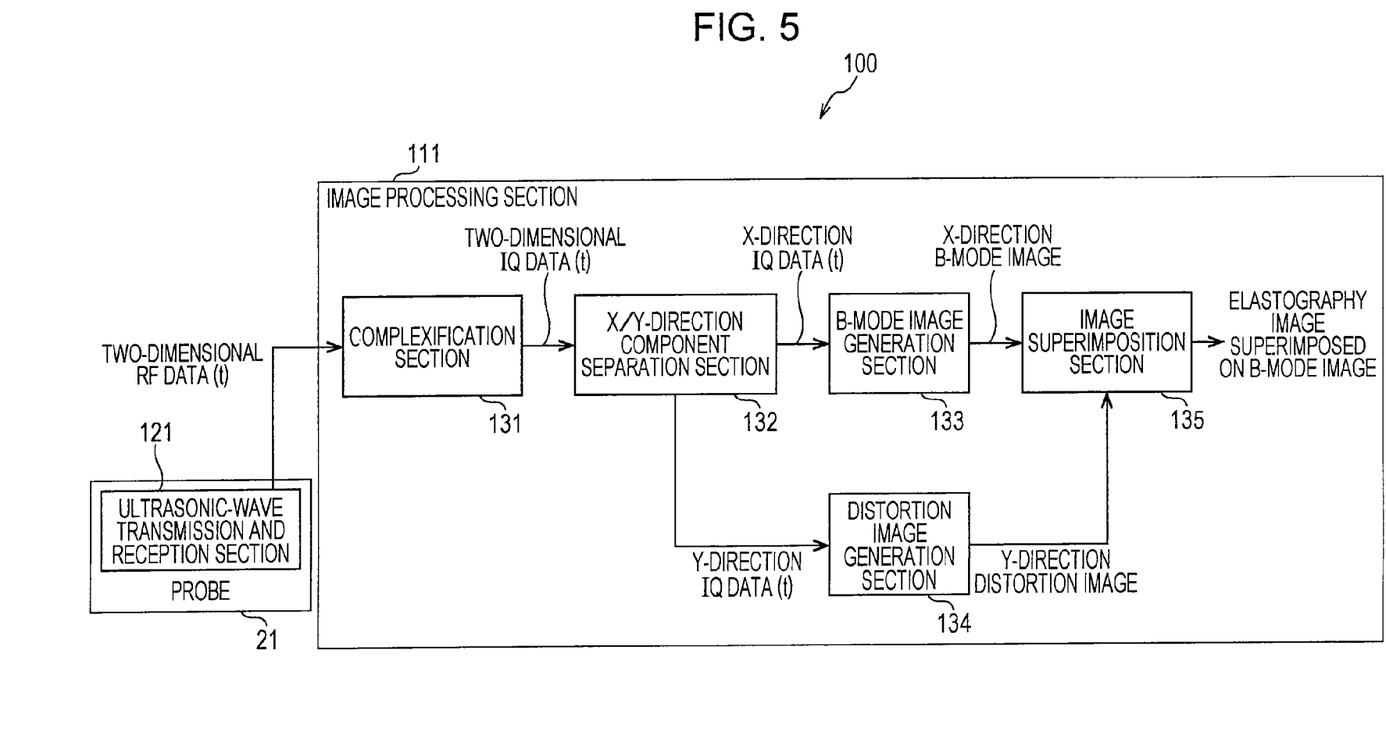
FIG. 5 is a block diagram illustrating an example of a configuration of an ultrasonic image processing apparatus to which the present technique is applied.

FIG. 5 is a diagram illustrating an example of a configuration of an ultrasonic image processing apparatus to which the image processing apparatus according to the present technique is applied.

An ultrasonic image processing apparatus 100 illustrated in FIG. 5 is an apparatus that captures an image of the inside of an examinee (object) (that is to say, an ultrasonic image) using ultrasonic waves, and displays the image. The ultrasonic image processing apparatus 100 is used, for example for capturing an image of the inside of a patient's body, an unborn baby, and the like for medical applications, for directly being put on an internal organ and tissue during an operation, and for capturing a cross sectional image of the inside of a product for industrial use, and the like.

In particular, the ultrasonic image processing apparatus 100 captures an ultrasonic image of a subject, and displays an elastography image (also called a distortion image) that evaluates (examines) the stiffness of tissue using ultrasonic waves.

The ultrasonic image processing apparatus 100 is configured to include the probe 21 illustrated in FIG. 2, and an image processing section 111.

The probe 21 is a part that is pressed on a subject (a living body; for example, skin), or the like to capture the image of the subject. In this regard, the probe 21 may be a 1.5-D array, or a 2D-array.

The probe 21 is an ultrasonic wave probe for outputting ultrasonic waves, and receiving the reflected waves that are produced by reflection of the ultrasonic waves from an examinee (the inside of the body thereof), and includes a ultrasonic-wave transmission and reception section 121.

The ultrasonic-wave transmission and reception section 121 is disposed at the head of the probe 21, for example. The ultrasonic-wave transmission and reception section 121 generates and outputs ultrasonic waves, and receives reflected waves that are produced by reflection of the ultrasonic waves on the examinee, and outputs the reflected wave data (RF data) indicating the intensity of the reflected waves to the complexification section 131 of the image processing section 111.

The image processing section 111 includes a complexification section 131, an X/Y-direction component separation section 132, a B-mode image generation section 133, a distortion image generation section 134, and an image superimposition section 135.

The complexification section 131 receives input of N×M lines of RF data, which has been received by the probe 21. Here, N is the number of elements in the X-direction, and M is the number of elements in the Y-direction. The complexification section 131 transforms the real-number RF data into complex-number IQ data. For example, an orthogonal transformation, or the Hilbert transformation is used. The complexification section 131 outputs the IQ data to the X/Y-direction component separation section 132.

The X/Y-direction component separation section 132 generates a pair of IQ data from the complexification section 131 (the X-direction IQ data and the Y-direction IQ data). The X-direction IQ data is IQ data disposed in the X-direction, and for example is a group of N lines of IQ data at M/2 position. The Y-direction IQ data is IQ data disposed in the Y-direction, and for example is a group of M lines of IQ data at each of the positions 0 to N−1.

The X-direction IQ data is used for generating the B-mode image. The Y-direction IQ data is used for calculating the amount of distortion in consideration of movement. The X/Y-direction component separation section 132 outputs the X-direction IQ data to the B-mode image generation section 133, and outputs the Y-direction IQ data to the distortion image generation section 134.

The B-mode image generation section 133 generates an X-direction B (Brightness) mode image (brightness image) from the X-direction IQ data received from the X/Y-direction component separation section 132, and outputs the generated X-direction B-mode image to the image superimposition section 135.

The distortion image generation section 134 detects a displacement that arises from the Z-direction vibration using the Y-direction IQ data from the X/Y-direction component separation section 132, calculates an amount of distortion from the amount of displacement, and outputs the Y-direction distortion image (the elastography image), which has been produced by converting the amount of distortion into color information, to the image superimposition section 135.

The image superimposition section 135 superimposes the Y-direction elastography image from the distortion image generation section 134 on the X-direction B-mode image from the B-mode image generation section 133. Thereby, the image superimposition section 135 outputs the elastography image (the distortion image) superimposed on the B-mode image, and the resultant image is displayed on the subsequent display section not illustrated in FIG. 5.

Configuration of B-Mode Image Generation Section

Figure 6:
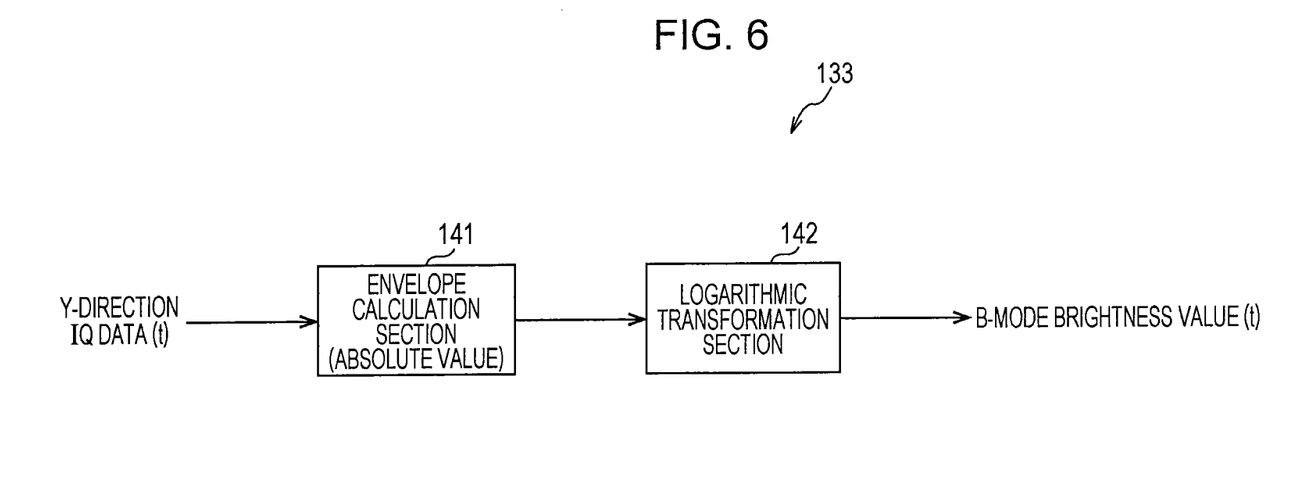
FIG. 6 is a block diagram illustrating an example of a configuration of a B-mode image generation section.

FIG. 6 is a block diagram illustrating an example of a configuration of the B-mode image generation section.

In the example in FIG. 6, the B-mode image generation section 133 includes an envelope calculation section 141, and a logarithmic transformation section 142.

The envelope calculation section 141 calculates an envelope (an absolute value) using the X-direction IQ data. The logarithmic transformation section 142 performs logarithmic transformation on the basis of the envelope calculated by the envelope calculation section 141 to transform the amplitude of the envelope into brightness so as to generate the X-direction B-mode image (brightness image). The logarithmic transformation section 142 supplies the generated X-direction B-mode image to the image superimposition section 135.

Configuration of Distortion Image Generation Section

Figure 7:
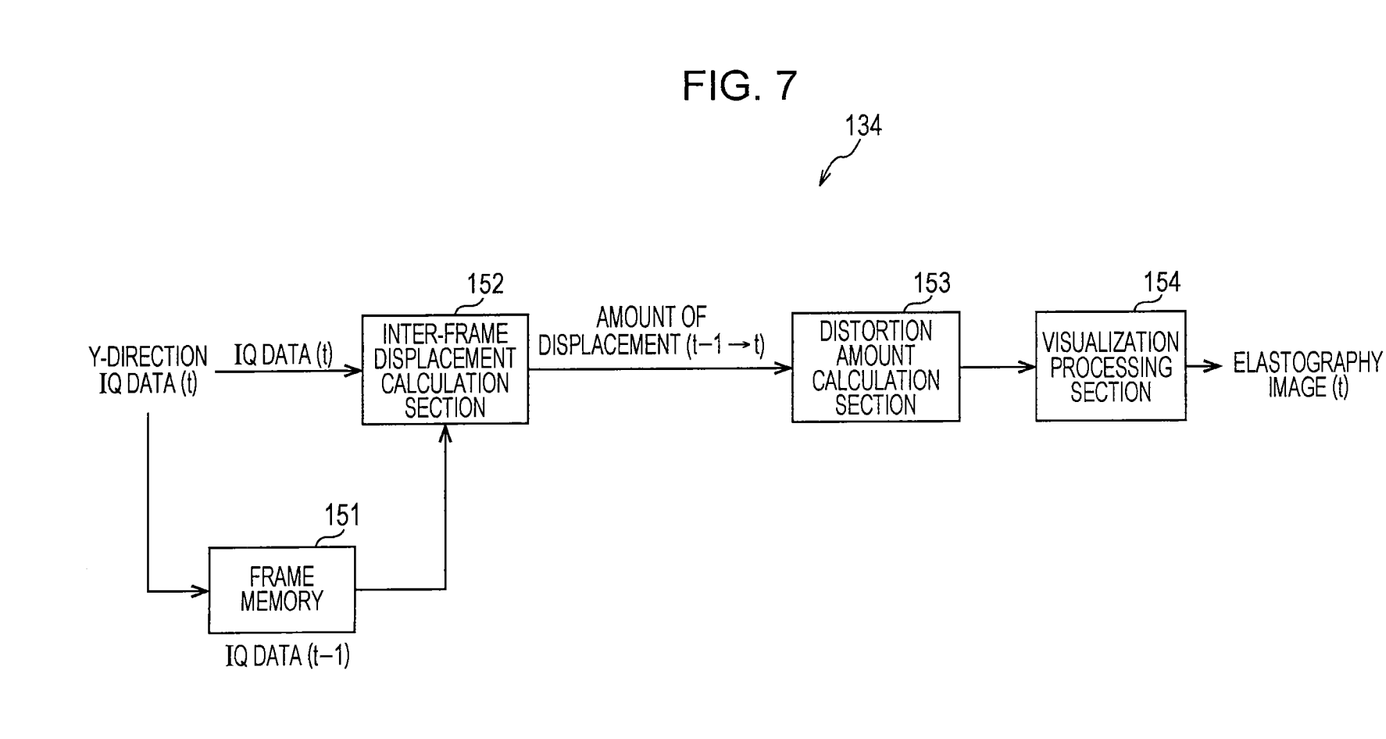
FIG. 7 is a block diagram illustrating an example of a configuration of a distortion image generation section.

FIG. 7 is a block diagram illustrating an example of a configuration of the distortion image generation section. In this regard, the processing in the distortion image generation section 134 is executed for each group of the M lines of IQ data at each of the positions 0 to N−1.

In the example in FIG. 7, the distortion image generation section 134 includes a frame memory 151, an inter-frame displacement calculation section 152, a distortion amount calculation section 153, and a visualization processing section 154.

The Y-direction IQ data is input into the frame memory 151, and the inter-frame displacement calculation section 152 from the X/Y-direction component separation section 132 in FIG. 5.

The frame memory 151 stores the Y-direction IQ data (data at different time (for example, immediately before)) from the X/Y-direction component separation section 132.

The inter-frame displacement calculation section 152 detects a displacement that arises from the Z-direction vibration using the Y-direction IQ data (hereinafter, also referred to as IQ data (t)) at time t from the X/Y-direction component separation section 132, and the Y-direction IQ data (hereinafter, also referred to as IQ data (t−1)) at time (t−1) from the frame memory 151. At that time, a line shift that is caused by movement in the Y-direction is detected and corrected, and the displacement that arises from the Z-direction vibration is detected. In this regard, the data at time (t−1) means the immediately-before data, but the data to be used is not limited to this, and data at different time ought to be used. The inter-frame displacement calculation section 152 supplies the detected amount of displacement to the distortion amount calculation section 153.

The distortion amount calculation section 153 calculates the amount of distortion on the basis of the amount of displacement from the inter-frame displacement calculation section 152. For example, it is possible to obtain the amount of distortion by differentiating the amount of displacement. For example, if the gradient of the differential values is large, it means that there is a large distortion, whereas if the gradient is small, it means that the distortion is small. The distortion amount calculation section 153 supplies the calculated amount of distortion to the visualization processing section 154.

The visualization processing section 154 converts the amount of distortion into color information. In this regard, a large distortion means that an object to be examined is soft, whereas a small distortion means that the object is stiff. For example, an average value of the amount of distortion in a screen is visualized as green, a smaller value of the amount of distortion than the average value in a screen is visualized as blue, and a larger value of the amount of distortion than the average value in a screen is visualized as red. The visualization processing section 154 outputs the converted color information to the image superimposition section 135 in FIG. 5 as an elastography image (Y-direction distortion image).

Configuration of Inter-Frame Displacement Calculation Section

Figure 8:
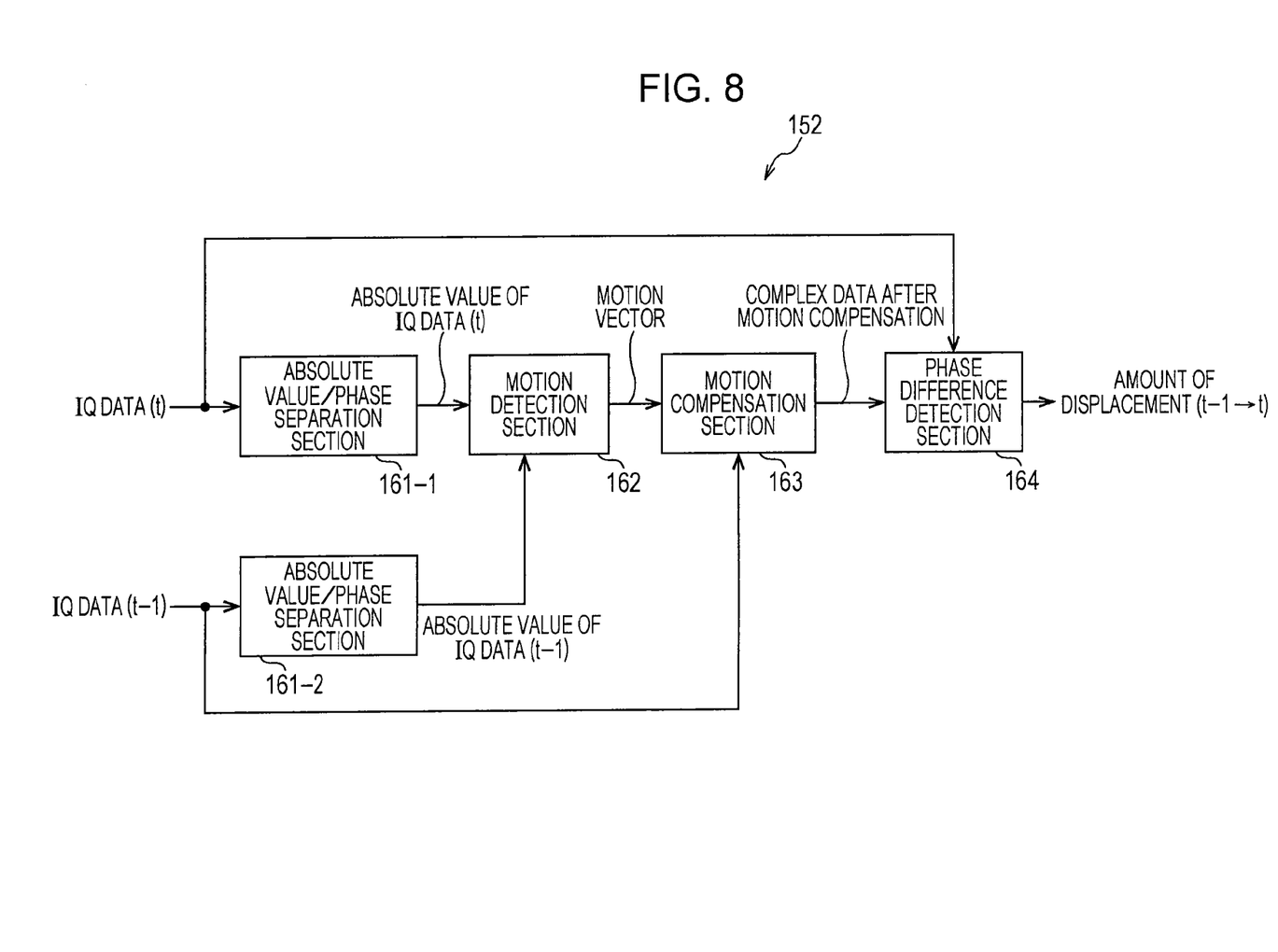
FIG. 8 is a block diagram illustrating an example of a configuration of an inter-frame displacement calculation section.

FIG. 8 is a block diagram illustrating an example of a configuration of the inter-frame displacement calculation section.

In FIG. 8, the inter-frame displacement calculation section 152 includes an absolute value/phase separation sections 161-1 and 161-2, a motion detection section 162, a motion compensation section 163, and a phase difference detection section 164.

The Y-direction IQ data (t) from the X/Y-direction component separation section 132 in FIG. 6 is input into the absolute value/phase separation section 161-1, and the phase difference detection section 164. The Y-direction IQ data (t−1) from the frame memory 151 in FIG. 7 is input into the absolute value/phase separation section 161-2, and the motion compensation section 163.

The absolute value/phase separation section 161-1 separates the absolute value and the phase from the Y-direction IQ data (t), obtains the absolute value of the IQ data (t), and outputs the obtained absolute value to the motion detection section 162. The absolute value/phase separation section 161-2 separates the absolute value and the phase from the Y-direction IQ data (t−1), obtains the absolute value of the IQ data (t−1), and outputs the obtained absolute value to the motion detection section 162.

The motion detection section 162 detects the amount of motion between time t and time (t−1) using the IQ data absolute value components. For example, the amount of motion is detected as a motion vector using block matching. In this regard, positioning is performed on the basis of the motion detection. That is to say, so far as positioning is possible, it is not limited to motion detection, and the method of motion detection is not limited to block matching. The motion detection section 162 outputs the detected motion vector to the motion compensation section 163.

The motion compensation section 163 performs interpolation processing on the IQ data at time (t−1) using the motion vectors detected by the motion detection section 162, and generates complex data having been subjected to the motion compensation. A description will be given of the interpolation processing with reference to FIG. 9.

Figure 9:
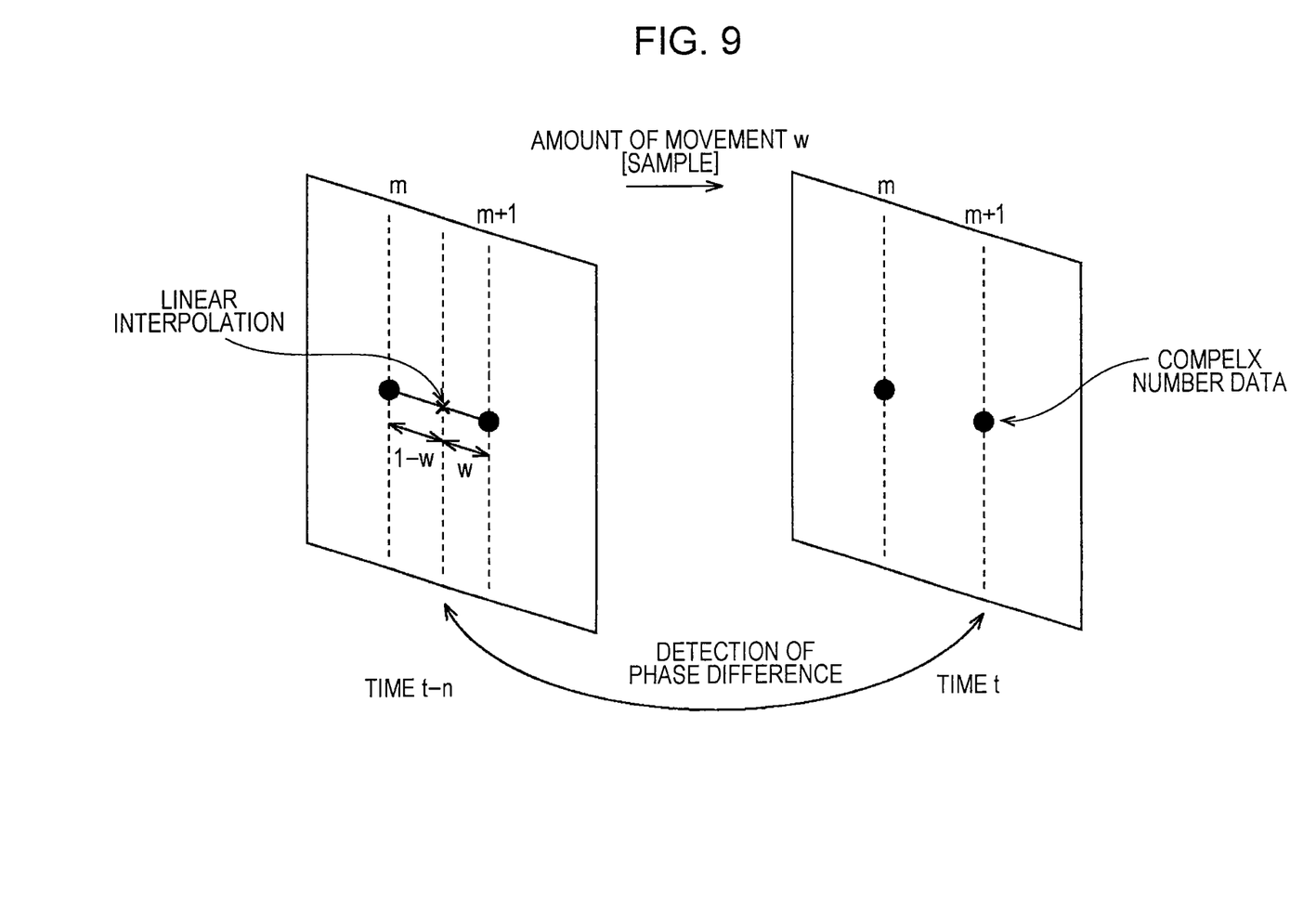
FIG. 9 is a diagram illustrating an example of interpolation processing of IQ data.

FIG. 9 is a diagram illustrating an example of the interpolation processing. In the example in FIG. 9, m and +1) are IQ data that are adjacent to each other. When the amount of movement w is less than a pitch between elements, IQ data between m and (m+1) is generated by the interpolation processing. For example, by applying linear interpolation using the amount of movement w as the amount of weight on the complex number data, it is possible to generate interpolated data (complex data after motion compensation). The motion compensation section 163 outputs the complex data after the motion compensation to the phase difference detection section 164.

The phase difference detection section 164 detects the phase difference between the IQ data at time t, and the IQ data at time (t−1) after the motion compensation, and calculates the amount of displacement. For example, for the method of detecting a phase difference, an autocorrelation method, or the like is used. The phase difference detection section 164 supplies the calculated amount of displacement to the distortion amount calculation section 153.

Ultrasonic Image Generation Processing

Figure 10:
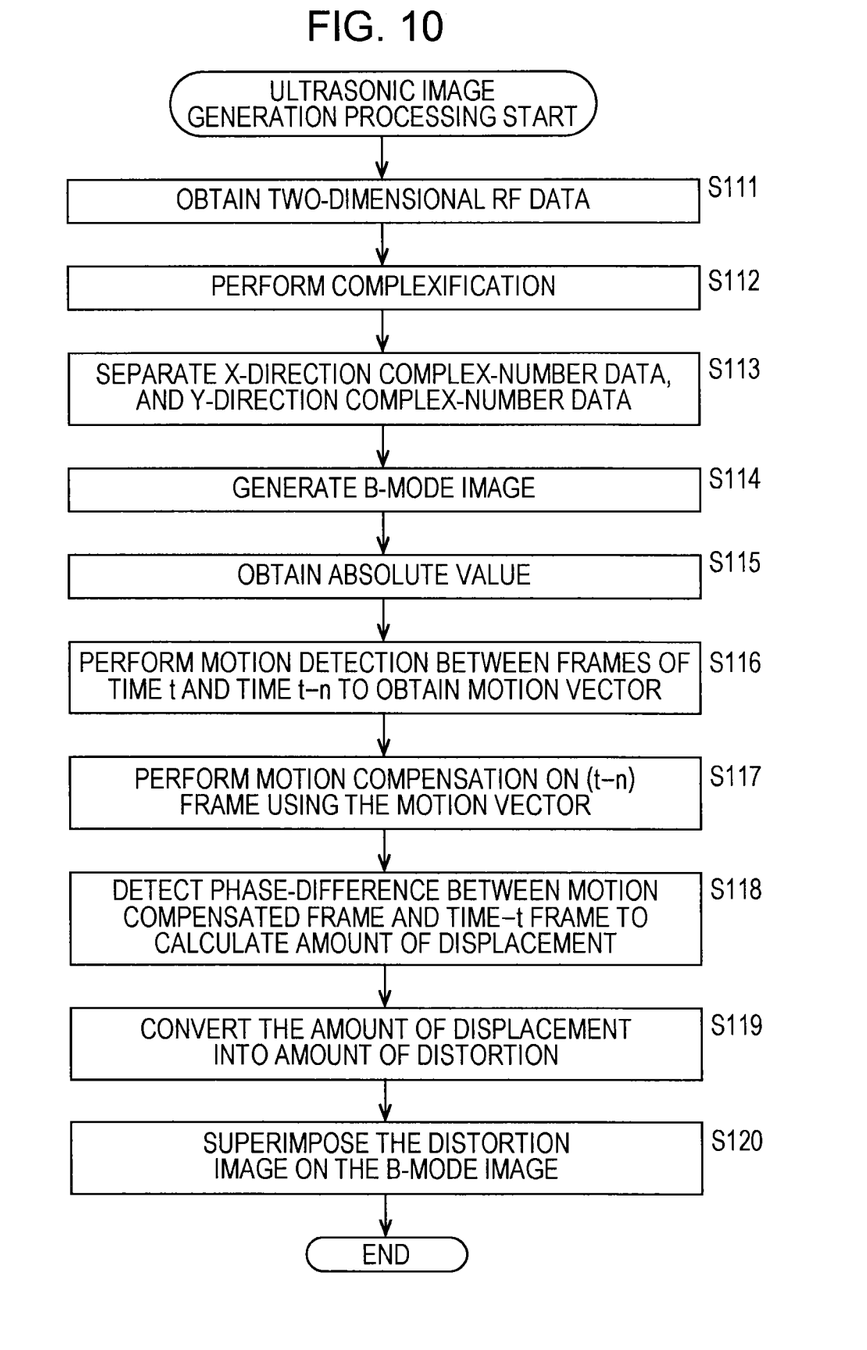
FIG. 10 is a flowchart illustrating an example of ultrasonic image processing.

Next, a description will be given of ultrasonic image processing in the ultrasonic image processing apparatus 100 with reference to a flowchart in FIG. 10.

The ultrasonic-wave transmission and reception section 121 of the probe 21 generates and outputs ultrasonic waves, and receives the reflected ultrasonic waves produced by reflection from an examinee, and supplies the reflected wave data (RF data) representing the intensity of the reflected waves to the complexification section 131 of the image processing section 111.

In step S111, the complexification section 131 obtains two-dimensional RF data.

In step S112, the complexification section 131 performs complexification on the obtained RF data. That is to say, the complexification section 131 transforms the real-number RF data to complex-number IQ data, and outputs the transformed IQ data to the X/Y-direction component separation section 132.

In step S113, the X/Y-direction component separation section 132 separates the X-direction complex number data, and the Y-direction complex number data. The X/Y-direction component separation section 132 outputs the X-direction IQ data to the B-mode image generation section 133, and outputs the Y-direction IQ data to the distortion image generation section 134.

In step S114, the B-mode image generation section 133 generates an X-direction B-mode image (brightness image) from the X-direction IQ data that has been received from the X/Y-direction component separation section 132. That is to say, the envelope calculation section 141 calculates an envelope (absolute value) using the X-direction IQ data. The logarithmic transformation section 142 performs logarithmic transformation on the basis of the envelope calculated by the envelope calculation section 141, and transforms the amplitude of the envelope into brightness in order to generate the X-direction B-mode image (brightness image).

The B-mode image generation section 133 (the logarithmic transformation section 142) outputs the generated X-direction B-mode image to the image superimposition section 135.

In the distortion image generation section 134, the Y-direction IQ data (t) from the X/Y-direction component separation section 132 in FIG. 5 is input into the absolute value/phase separation section 161-1, and the phase difference detection section 164. The Y-direction IQ data (t−1) from the frame memory 151 in FIG. 7 is input into the absolute value/phase separation section 161-2, and the motion compensation section 163.

In step S115, the absolute value/phase separation sections 161-1 and 161-2 obtain the absolute value of the Y-direction IQ data. That is to say, the absolute value/phase separation section 161-1 separates the absolute value and the phase from the Y-direction IQ data (t), obtains the absolute value of the IQ data (t), and outputs the obtained absolute value to the motion detection section 162. The absolute value/phase separation section 161-2 separates the absolute value and the phase from the Y-direction IQ data (t−1), obtains the absolute value of the IQ data (t−1), and outputs the obtained absolute value to the motion detection section 162.

In step S116, the motion detection section 162 performs motion detection between the frames at time t, and at time (t−n) to obtain motion vectors. The motion detection section 162 outputs the detected motion vectors to the motion compensation section 163.

In step S117, the motion compensation section 163 performs motion compensation on the frame at time (t−n) using the motion vectors detected by the motion detection section 162. That is to say, the motion compensation section 163 performs interpolation processing on the IQ data (t−n) to generate the complex data after the motion compensation. The motion compensation section 163 outputs the complex data after the motion compensation to the phase difference detection section 164.

In step S118, the phase difference detection section 164 detects the phase difference between the motion compensation frame (the IQ data at time (t−1) after the motion compensation), and the IQ data at time t, and calculates the amount of displacement. The phase difference detection section 164 outputs the calculated amount of displacement to the distortion amount calculation section 153.

In step S119, the distortion amount calculation section 153 transforms the amount of displacement from the inter-frame displacement calculation section 152 into an amount of distortion. For example, the amount of distortion is obtained by differentiating the amount of displacement. The distortion amount calculation section 153 supplies the amount of distortion calculated by the transformation to the visualization processing section 154.

Next, the visualization processing section 154 converts the amount of distortion into color information. The visualization processing section 154 outputs the converted color information to the image superimposition section 135 in FIG. 5 as the elastography image (the Y-direction distortion image).

In step S120, the image superimposition section 135 superimposes the Y-direction elastography image from the distortion image generation section 134 on the X-direction B-mode image from the B-mode image generation section 133. Thereby, the image superimposition section 135 outputs the elastography image (the distortion image) superimposed on the B-mode image.

In the present technique, when the probe is moved, the amount of shift between frames in the moving direction of the probe is corrected, then the phase difference is detected, and the amount of distortion is calculated.

Thereby, it is possible to perform displacement detection correctly in the state of moving the probe. Accordingly, it is possible to correctly obtain the stiffness of tissue.

Also, it is possible to evaluate the stiffness of tissue while moving the probe, and thus the testing time is shortened, and the workload of the operator (examiner) is reduced.

In this regard, as described above with reference to FIG. 1, the movement of the probe includes not only intentional operation by a user, but also unintentional movement by the user, such as camera shake, or the like. That is to say, even if camera shake occurs, it is possible to correctly perform displacement detection.

Further, in the above-described description, a description has been given of an example in which a B-mode image is combined with an elastography image (distortion image), and displayed. However, an elastography image may be displayed without combining a B-mode image. Also, an image to be combined with is not limited to a B-mode image, and any image may be combined. Specifically, it is possible to combine an elastography image with a CT image of a subject, an MRI image of a subject, an endoscope image of a subject (a video image or a still image captured by an endoscope), or the like as an image on a subject.

In this regard, it is possible to apply the present technique not only to the case of intentional movement of a probe, but also to the case of movement by camera shake, or the like.

Also, it is possible to apply the present technique both for medical use, and for non-medical use. Also, it is possible to apply the present technique not only to a human being, but also to various scenes in which a cross-sectional view of a subject is taken by ultrasonic waves. For example, the subject may be an animal, a plant, an artificial object, or the like.

The above-described series of processing can be executed by hardware or can be executed by software. When the series of processing is executed by software, programs of the software may be installed in a computer. Here, the computer includes a computer that is built in a dedicated hardware, and for example, a general-purpose personal computer, etc., capable of executing various functions by installing various programs.

Second Embodiment

Example of Configuration of Computer

Figure 11:
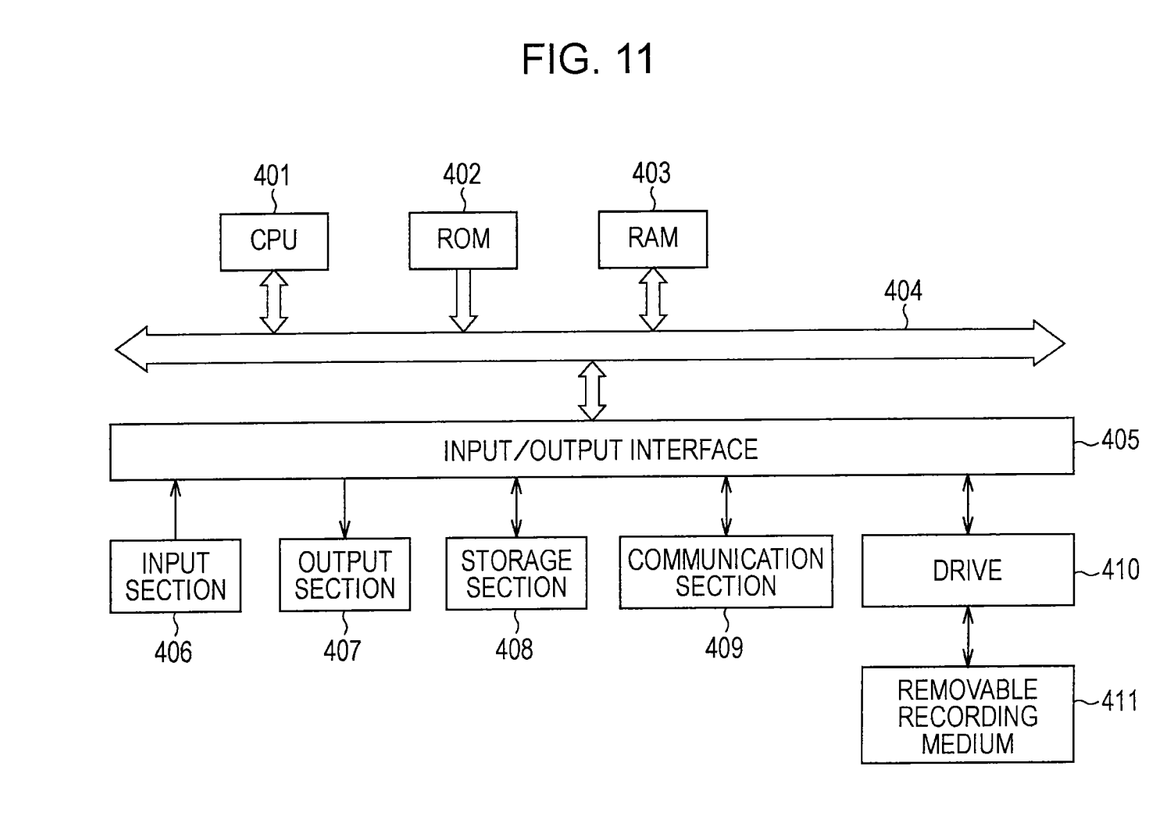
FIG. 11 is a block diagram illustrating an example of a configuration of a computer.

FIG. 11 is a block diagram illustrating an example of a hardware configuration of a computer that executes the above-described series of processing by programs.

In the computer, a CPU (Central Processing Unit) 401, a ROM (Read Only Memory) 402, and a RAM (Random Access Memory) 403 are mutually connected through a bus 404.

An input/output interface 405 is further connected to the bus 404. An input section 406, an output section 407, a storage section 408, a communication section 409, and a drive 410 are connected to the input/output interface 405.

The input section 406 includes a keyboard, a mouse, a microphone, and so on. The output section 407 includes a display, a speaker, and so on. The storage section 408 includes a hard disk, a nonvolatile memory, and so on. The communication section 409 includes a network interface, and so on. The drive 410 drives a removable recording medium 411, such as a magnetic disk, an optical disc, a magneto-optical disc, or a semiconductor memory, and so on.

In the computer having the configuration as described above, the CPU 401 loads the program stored, for example in storage section 408 to the RAM 403 through the input/output interface 405 and the bus 404 to execute the program, and thereby the above-described series of processing is performed.

It is possible to record the program to be executed on the computer (the CPU 401) on the removable medium 411, for example, on a package medium, etc., and to provide the package medium. Also, it is possible to provide the program through a wired or wireless transmission medium, such as a local area network, the Internet, digital satellite broadcasting.

In the computer, it is possible to install the program into the storage section 408 through the input/output interface 405 by attaching the removable medium 411 to the drive 410. Also, it is possible to receive the program by the communication section 409 through a wired or wireless transmission medium, and to install into the storage section 408. In addition, it is possible to install the program in the ROM 402 or the storage section 408 in advance.

In this regard, the programs executed by the computer may be programs that are processed in time series in accordance with the described sequence in this specification. Alternatively, the programs may be programs to be executed in parallel or at necessary timing, such as at the time of being called, or the like.

Also, in this specification, a term "system" represents an overall apparatus including a plurality of devices, blocks, mechanisms, or the like.

In this regard, embodiments according to the present disclosure is not limited to the above-described embodiments. It is possible to make various changes without departing from the gist of the present disclosure.

In the above, detailed descriptions have been given of preferable embodiments of the present disclosure with reference to the accompanying drawings. However, the present disclosure is not limited to those examples. It is obvious to a person, who has a common knowledge in the technical field to which the present disclosure pertains, that various changes or modifications may be made within the spirit and scope of the appended claims. Such changes and modifications are of course construed within the spirit and scope of the present disclosure.

In this regard, it is possible to configure the present technique as follows.

(1) An image processing apparatus including: when a probe is moved, a shift amount correction section configured to correct an amount of shift from a first frame to a second frame being a frame at different time from the first frame; and a distortion amount calculation section configured to calculate an amount of distortion on the basis of a phase difference detected from the first frame and the second frame having been subjected to shift amount correction by the shift amount correction section.

(2) The image processing apparatus according to (1), further including a superimposition section configured to superimpose the amount of distortion calculated by the distortion amount calculation section on a B-mode image.

(3) The image processing apparatus according to (2), wherein the first frame and the second frame are images having a direction other than a direction parallel to a direction in which the B-mode image is generated.

(4) The image processing apparatus according to (2), wherein the first frame and the second frame are images having a direction parallel to a direction in which the B-mode image is generated.

(5) The image processing apparatus according to (2), wherein the first frame and the second frame are images having a direction parallel to a direction in which the probe is moved.

(6) The image processing apparatus according to (2), wherein the superimposition section superimposes the amount of distortion calculated by the distortion amount calculation section on the B-mode image in a direction perpendicular to a direction of calculating the amount of distortion.

(7) The image processing apparatus according to (2), wherein the superimposition section superimposes the amount of distortion calculated by the distortion amount calculation section on the B-mode image in a direction parallel to a direction of calculating the amount of distortion.

(8) The image processing apparatus according to (2), further including a superimposition section configured to superimpose the amount of distortion calculated by the distortion amount calculation section on an endoscope image of a subject.

(9) A method of processing an image for causing an image processing apparatus to perform processing including: when a probe is moved, correcting an amount of shift from a first frame to a second frame being a frame at different time from the first frame; and calculating an amount of distortion on the basis of a phase difference detected from the first frame and the second frame having been subjected to correction of the amount of shift by the shift amount correction section.

(10) An ultrasonic diagnostic apparatus including: a probe; and an image processing section, wherein the image processing section includes when a probe is moved, a shift amount correction section configured to correct an amount of shift from a first frame to a second frame being a frame at different time from the first frame; and a distortion amount calculation section configured to calculate an amount of distortion on the basis of a phase difference detected from the first frame and the second frame having been subjected to correction of the amount of shift by the shift amount correction section.

(11) The ultrasonic diagnostic apparatus according to (10), wherein the image processing section further includes a superimposition section configured to superimpose the amount of distortion calculated by the distortion amount calculation section on a B-mode image.

(12) The ultrasonic diagnostic apparatus according to (11), wherein the probe includes a plurality of piezoelectric elements in a first direction, and in a second direction being perpendicular to the first direction, respectively, and the first frame, and the second frame are images having a direction other than a direction parallel to a direction of generating the B-mode image.

What is claimed is:
1. An image processing apparatus comprising:
circuitry configured to
correct, when a probe is moved, an amount of shift from a first frame to a second frame being a frame at different time from the first frame,
calculate an amount of distortion on the basis of a phase difference detected from the first frame and the second frame having been subjected to shift amount correction by the shift amount correction section, and
superimpose the calculated amount of distortion on a B-mode image.
2. The image processing apparatus according to claim 1, wherein the first frame and the second frame are images having a direction other than a direction parallel to a direction in which the B-mode image is generated.
3. The image processing apparatus according to claim 1, wherein the first frame and the second frame are images having a direction parallel to a direction in which the B-mode image is generated.
4. The image processing apparatus according to claim 1, wherein the first frame and the second frame are images having a direction parallel to a direction in which the probe is moved.
5. The image processing apparatus according to claim 1, wherein the circuitry is further configured to superimpose the calculated amount of distortion on the B-mode image in a direction perpendicular to a direction of calculating the amount of distortion.
6. The image processing apparatus according to claim 1, wherein the circuitry is further configured to superimpose the calculated amount of distortion on the B-mode image in a direction parallel to a direction of calculating the amount of distortion.
7. The image processing apparatus according to claim 1, wherein the circuitry is further configured to superimpose the calculated amount of distortion on an endoscope image of a subject.
8. A method of processing an image for causing an image processing apparatus to perform processing comprising:

when a probe is moved, correcting an amount of shift from a first frame to a second frame being a frame at different time from the first frame;

calculating an amount of distortion on the basis of a phase difference detected from the first frame and the second frame having been subjected to correction of the amount of shift by the shift amount correction section; and superimposing the calculated amount of distortion on a B-mode image.

9. An ultrasonic diagnostic apparatus comprising:

a probe; and circuitry configured to correct, when a probe is moved, an amount of shift from a first frame to a second frame being a frame at different time from the first frame, calculate an amount of distortion on the basis of a phase difference detected from the first frame and the second frame having been subjected to correction of the amount of shift by the shift amount correction section, and superimpose the calculated amount of distortion on a B-mode image.

10. The ultrasonic diagnostic apparatus according to claim 9, wherein the probe includes a plurality of piezoelectric elements in a first direction, and in a second direction being perpendicular to the first direction, respectively, and the first frame, and the second frame are images having a direction other than a direction parallel to a direction of generating the B-mode image.

11. The image processing apparatus according to claim 1, wherein the circuitry is further configured to control display of the B-mode image having superimposed thereon the calculated amount on a display.

12. The image processing apparatus according to claim 1, wherein the calculated amount of distortion is represented by an elastography image.

* * * * *